3,061,520
SUNBURN PREVENTIVE COMPOSITIONS
Wayne E. Feely, Rydal, Pa., assignor to Rohm & Haas Company, Philadelphia, Pa., a corporation of Delaware
Filed Mar. 10, 1960, Ser. No. 14,108
7 Claims. (Cl. 167—90)

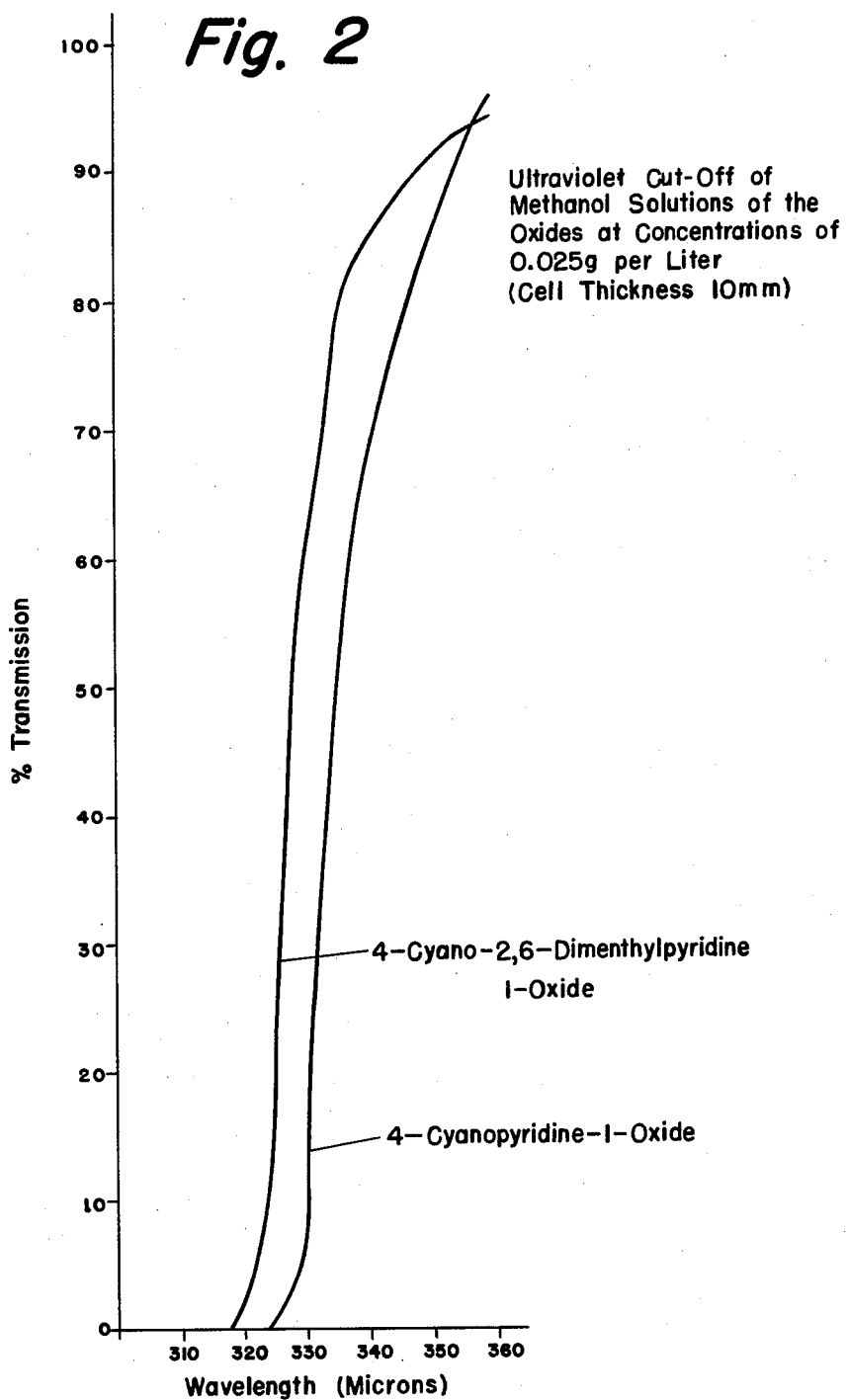

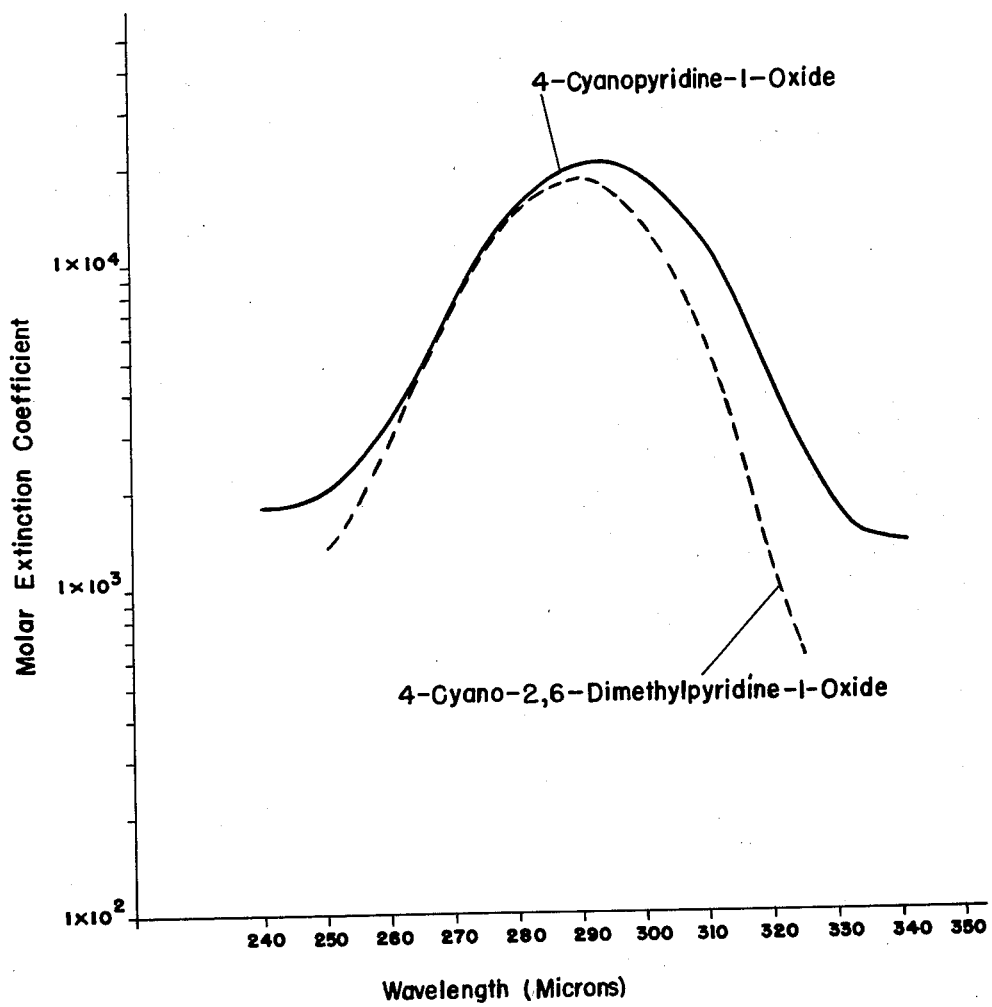

This invention concerns compounds which are ultraviolet absorbents and, more particularly, the use of these compounds as ultraviolet absorbents in sunburn preventive compositions. The compositions of the present invention protect the skin against sunburn by absorbing or filtering out the harmful ultraviolet rays which cause burning while permitting the passage of those rays which cause tanning of the skin without harmful burning. In general, suitable sunscreen agents should filter out most of the ultraviolet light in the region from about 2900 to about 3100 A., but permit passage of the rays in the region from about 3100 to about 3600 A. While the rays in the first region are mainly responsible in causing severe sunburn on overexposure, the rays in the latter region are responsible for causing the commonly desired tan.

This application is a continuation-in-part of my copending application Serial No. 759,859, filed September 9, 1958, now U.S. Patent 2,991,285.

Sunburn preventive compositions, in addition to possessing the required property of absorbing or screening out the ultraviolet rays which cause sunburn and permitting the passage of the ultraviolet rays which permit tanning, must possess other desirable properties. They must, of necessity, be stable on exposure to ultraviolet light and air in order to retain their protective effect on usage. While some sunscreen compounds are initially very effective in absorbing ultraviolet light in the harmful range, they are rapidly decomposed on exposure and thus lose their effectiveness. Suitable compounds should have an effective life of four hours at least and preferably eight hours or more.

They must also possess adequate shelf life when compounded with the other ingredients normally employed in such cosmetic preparations. Furthermore, the compounds must be non-toxic and non-irritating, not only from a topical standpoint, but preferably also from the standpoint of oral ingestion. It is further desirable that the sunscreening compounds, at least in the amounts required to obtain adequate sunscreening, should be soluble in a variety of solvents or media so that they can be easily incorporated into solutions or lotions, emulsions, or cream-like cosmetic preparations.

It has been discovered that 4-cyanopyridine-N-oxides of the formula

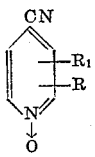

in which R and $R_1$ are hydrogen or lower alkyl containing 1 to 4 carbon atoms, fulfill the requirements as set forth hereinbefore for satisfactory sunscreen compounds for use in sunburn preventive compositions. These compounds exhibit very effective absorption of ultraviolet light in the range from about 2900 to about 3100 A., but permit passage of the tanning rays in the region from about 3100 to about 3600 A. The ultraviolet light absorbing properties of these compounds do not change on exposure to sunlight for periods in excess of 24 hours, and no decomposition of the compounds is observed on exposure to sunlight for the same period.

Suitable compounds for use in the practice of the present invention include the following:

4-cyanopyridine-N-oxide,
4-cyano-2-methylpyridine-N-oxide,
4-cyano-3-methylpyridine-N-oxide,
4-cyano-2-ethylpyridine-N-oxide,
4-cyano-3-propylpyridine-N-oxide,
4-cyano-2-butylpyridine-N-oxide,
4-cyano-2,6-dimethylpyridine-N-oxide,
4-cyano-2,5-diethylpyridine-N-oxide,
4-cyano-2,6-dipropylpyridine-N-oxide,
4-cyano-3,5-dibutylpyridine-N-oxide,
4-cyano-2-methyl-5-ethylpyridine-N-oxide,
4-cyano-3-ethyl-5-butylpyridine-N-oxide, and mixtures thereof. The nature of the alkyl group is not of great importance insofar as the ultraviolet light absorption is concerned. The addition of alkyl groups to the molecule shifts the absorption maximum only slightly, and it appears that the "nucleus" 4-cyanopyridine-N-oxide is the important part of the structure insofar as ultraviolet light absorption is concerned. The alkyl groups do affect the solubility in non-polar solvents, the solubility in such solvents increasing as the carbon atom content of the alkyl group increases. This factor is of importance when cosmetic creams containing high proportions of oil-like materials are desired. For the purpose of the present invention, the compounds listed hereinbefore exhibit adequate solubility in a variety of solvents.

The method of preparation of the 4-cyanopyridine-N-oxides from the corresponding 4-cyanopyridines is essentially that set forth by Ochiai (J. Org. Chem. 18, 548 (1953)). The process comprises the stepwise addition of one mole of hydrogen peroxide as a 35% aqueous solution to one mole of the 4-cyanopyridine dissolved in glacial acetic acid. The temperature of the reaction mixture is maintained at about 70° C. to about 90° C. for a period of about six hours. After the removal of the acetic acid by vaccum distillation, water is added and the oxide is distilled in vacuo.

The concentration of the 4-cyanopyridine-N-oxide employed in the cosmetic vehicle will vary somewhat with the type of cosmetic vehicle employed. In general, the concentration of the 4-cyanopyridine-N-oxide is in the range of about 0.5% to about 5% by weight of the preparation. A preferred range is 1% to 3% by weight of the preparation because, although higher concentrations are not harmful, adequate protection against sunburn is provided at this economical range. Particularly if a pigment be added to the cosmetic vehicle, the lower ranges set forth hereinbefore provide adequate protection.

Oral and intraperitoneal toxicity tests were conducted on two representative compounds of this group, namely, 4-cyanopyridine-N-oxide (compound I) and 4-cyano-2,6-dimethylpyridine-N-oxide (compound II). The compounds were employed as 5% aqueous suspensions. The results were as follows:

| | Route of Administration | | | | | | | | |
|---|---|---|---|---|---|---|---|---|---|
| | Intraperitoneal | | | | | Oral | | | |
| Dose, mg./Kg. | 200 | 500 | 750 | 1,000 | 1,500 | 300 | 500 | 1,000 | 1,500 |
| Deaths/mice, 4-cyanopyridine oxide | 0/3 | 0/3 | 0/3 | 1/3 | 2/3 | 0/3 | 0/3 | 0/3 | 0/3 |
| Deaths/mice, 4-cyano-2,6-dimethylpyridine-N-oxide | 0/3 | 0/3 | 0/3 | 3/3 | 0/3 | 0/3 | 0/3 | 0/3 | 0/3 |

The above-noted data shows that these two representative compounds exhibit low intraperitoneal and oral toxicity.

FIGURE 1 shows the erythemal effect which is the degree of sunburning at a given wavelength based on a relative scale. It is apparent that the maximum sunburning is caused by ultraviolet light of wavelength approximately 2900 to 3100 A. It is also seen from FIGURE 1 that there is very little sunburn effect below about 2800 A. and very little above approximately 3100 A.

FIGURE 2 shows the percent transmission of ultraviolet light over a range of wavelengths for two typical N-oxides of the present invention. Neither of them show any transmission below about 3180 A. which, conversely means 100 percent adsorption of ultraviolet light below this wavelength; thus affording excellent protection against sunburn.

FIGURE 3 shows a graph of the ultraviolet spectra of the same two cyanopyridine N-oxides which are typical of the products of the present invention.

Figure 1:
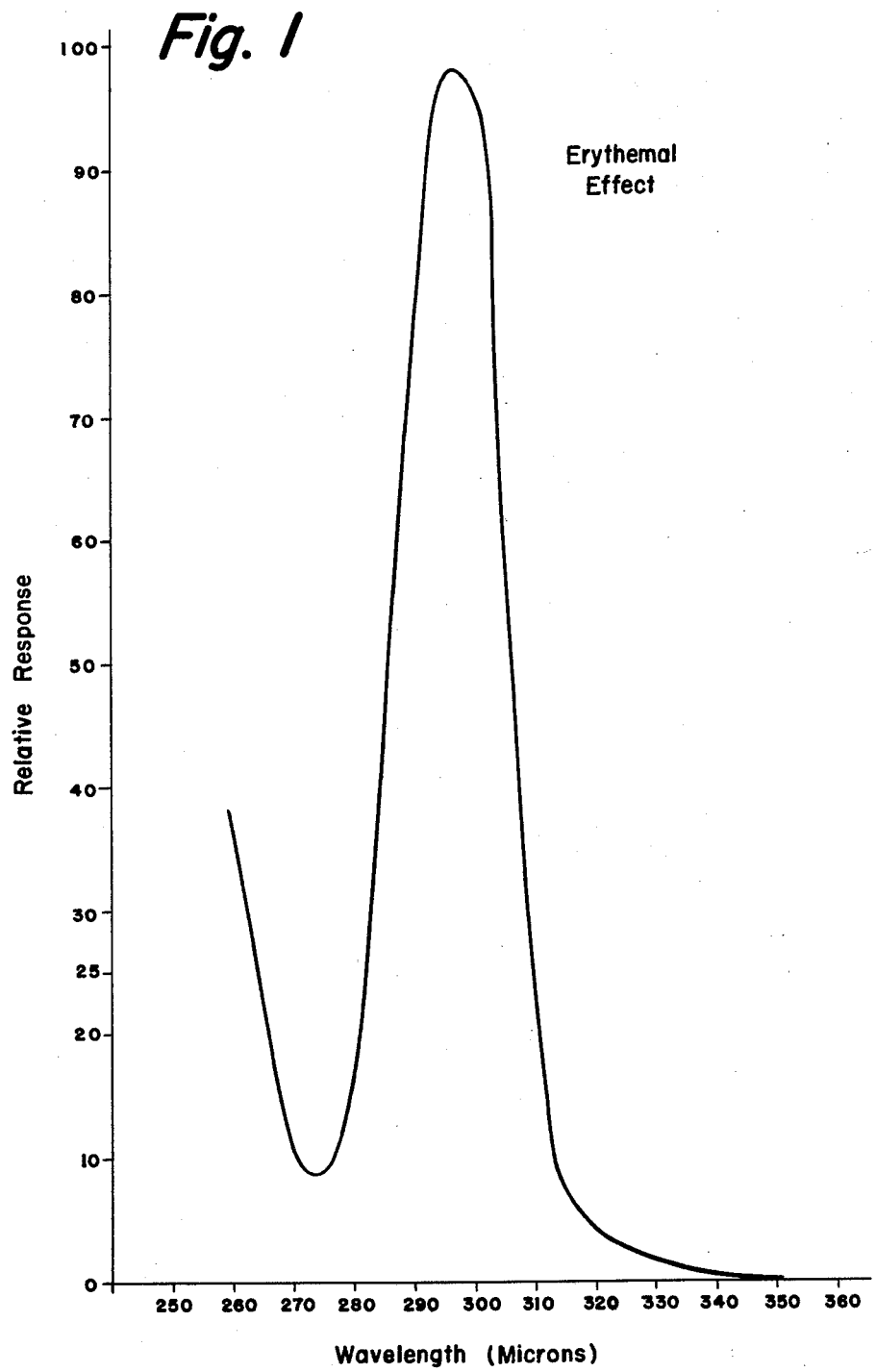

The ultraviolet absorption spectra of the cyanopyridine-N-oxides were determined by the standard method. The oxides were dissolved in absolute ethanol and the absorption of the solutions, in units of optical density versus wavelength, were determined using a Beckmann Model DK-2 double beam, recording ultraviolet spectrophotometer and quartz absorption cell of one centimeter path length. Absolute ethanol was used as the reference liquid.

The molar extinction coefficient, which may be regarded as the absorbance of a sample one centimeter thick and having a concentration of one mole per liter, was calculated at various wavelengths using the equation:

$$E_x = \frac{OD_x}{Cl}$$

where $E_x$ is the molar extinction coefficient, at wavelength $x$, $OD_x$ is the optical density at the same wavelength, C is the concentration of the solution in moles per liter, and $l$ is the path length of the cell in centimeters.

The molar extinction coefficient represents a method of expressing absolute intensity of absorption and this quantity is useful in that it enables one to compare the light-absorbing properties of various substances on an absolute basis.

A detailed discussion of this method may be found in any standard text on spectroscopy. A standard reference would be "Organic Chemistry," by H. Gilman, vol. III, page 127 et seq., John Wiley and Sons, New York, 1953.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

*Example I*

An alcohol base sunburn preventive solution was prepared by dissolving by heating 2 grams of 4-cyano-2,6-dimethylpyridine-N-oxide in a vehicle consisting of 57.5 grams ethanol and 5.5 grams castor oil and 5 grams water. A smooth lotion resulted which gave good protection against sunburn.

*Example II*

A typical oil in water sunscreen lotion was prepared as follows:

One gram of 4-cyanopyridine-N-oxide was dissolved in 64.3 grams of water by heating. There was added to this solution 4 grams of sorbitan monolaurate and 6 grams of an octylphenoxypolyethoxyethanol containing 11 to 13 ethoxy groups per molecule, followed by 25 grams of purified mineral oil, 0.18 gram of methyl parahydroxybenzoate, 0.02 gram propyl parahydroxybenzoate and the mixture was emulsified by agitating.

Modifications of such lotions may contain various perfumes as desired.

I claim:

1. A cosmetic composition for protecting the skin against sunburn while permitting tanning to occur which comprises an oil-containing vehicle and an effective amount, as a sun-screening agent, of a 4-cyanopyridine-N-oxide selected from the group consisting of 4-cyano-pyridine-N-oxide, 4-cyano-monoalkylpyridine-N-oxide in which the alkyl group contains 1 to 4 carbon atoms and 4-cyanodialkylpyridine-N-oxide in which the alkyl groups contain 1 to 4 carbon atoms.

2. A cosmetic composition for protecting the skin against sunburn while permitting tanning to occur which comprises an oil-containing vehicle and from about 0.5 to 5.0 percent by weight as a sunscreening agent, of a 4-cyanopyridine-N-oxide selected from the group consisting of 4-cyanopyridine-N-oxide, 4-cyano-monoalkyl-pyridine-N-oxide in which the alkyl group contains 1 to 4 carbon atoms and 4-cyano-dialkylpyridine-N-oxide in which the alkyl groups contain 1 to 4 carbon atoms.

3. A cosmetic composition as defined in claim 2 in which the sunscreening agent is 4-cyano-2,6-dimethyl-pyridine-N-oxide.

4. A method of protecting skin against sunburn which permits tanning to occur which comprises applying to said skin a film of a preparation including a cosmetic vehicle and, as a sunscreening agent, a 4-cyanopyridine-N-oxide selected from the group consisting of 4-cyanopyridine-N-oxide, 4-cyano-monoalkylpyridine-N-oxide in which the alkyl group contains 1 to 4 carbon atoms and 4-cyano-dialkylpyridine-N-oxide in which the alkyl groups contain 1 to 4 carbon atoms.

5. A method as defined in claim 4 in which the sunscreening agent is 4-cyano-2,6-dimethylpyridine-N-oxide.

6. A method as defined in claim 4 in which the 4-cyanopyridine-N-oxide is present in the cosmetic vehicle in a concentration of from about 0.5% to about 5% by weight.

7. A method as defined in claim 4 in which the 4- cyanopyridine-N-oxide is present in the cosmetic vehicle in a concentration of 1% to 3% by weight.

References Cited in the file of this patent

Damon: Deut. Chem. Ges, Berichte, vol. 72, 1939, page 1550.

Graf: Chem. Abs., vol. 30, 1936, page 7576.
Linstead: J. Chem. Soc., 1936, page 919.
Hamer: J. Chem. Soc., 1939, pages 1008–13.
Mumm: Justis Liebig's Annalen der Org. Chem., vol. 514, 1934, pp. 35–40.
Reider: Chem. Abst., vol. 36, 1942, page 5174.